United States Patent
Hwang et al.

[11] Patent Number: 5,976,366
[45] Date of Patent: Nov. 2, 1999

[54] SYSTEM FOR TREATING DESALTER EFFLUENT WATER

[75] Inventors: Ken Ho Hwang; Joo Kwan Park; Tai O Kim; Jung Choon Suh, all of Jeonranam-do, Rep. of Korea

[73] Assignee: LG-Caltex-Oil Corporation, Seoul, Rep. of Korea

[21] Appl. No.: 08/991,000

[22] Filed: Dec. 15, 1997

[30] Foreign Application Priority Data

Sep. 30, 1997 [KR] Rep. of Korea ............. 97-50109

[51] Int. Cl.⁶ .................................. C02F 1/20
[52] U.S. Cl. .................. 210/188; 96/182; 210/199; 210/202; 210/205; 210/511; 422/256
[58] Field of Search .................. 96/182, 202, 203; 210/188, 195.1, 199, 202, 205, 207, 208, 221.2, 511; 422/256

[56] References Cited

U.S. PATENT DOCUMENTS

| | | | |
|---|---|---|---|
| 3,414,523 | 12/1968 | Jockel | 252/324 |
| 4,076,615 | 2/1978 | Olesen et al. | 210/631 |
| 4,686,066 | 8/1987 | Hofinger et al. | 252/344 |
| 4,722,781 | 2/1988 | Swartz et al. | 208/188 |
| 4,749,492 | 6/1988 | Berrigan, Jr. et al. | 210/616 |
| 4,824,555 | 4/1989 | Paspek et al. | 208/187 |
| 4,897,196 | 1/1990 | Copa et al. | 210/616 |
| 5,219,471 | 6/1993 | Goyal et al. | 210/787 |
| 5,545,330 | 8/1996 | Ehrlich | 210/703 |
| 5,607,574 | 3/1997 | Hart | 208/188 |

*Primary Examiner*—Peter A. Hruskoci
*Attorney, Agent, or Firm*—Dickinson Wright PLLC

[57] ABSTRACT

The system for treating effluent water coming out from the desalter in accordance with the present invention comprises a slop oil separator 1 for removing oil components in the effluent water from the desalter; a WSR separator 2 for further removing emulsion type oil components using naphtha; a water stripper 4 for removing gas components such as $H_2S$ and $NH_3$ in the effluent water discharged from the WSR separator; a reaction tank 5 for reacting organic and/or inorganic impurity matters such as phenols and suspended solids in the effluent water discharged from the water stripper with activated charcoal; and a settling tank 6 in which an agglomerating agent is introduced, thereby precipitating sludge in the lower part of the settling tank. A buffering tank 3 may be installed between a desalter (not shown in FIG. 1) and an oil separator 1 or between a WSR separator 2 and a water stripper 4 to play a role as a buffer for safety in case of an accident in the process. Activated charcoal is introduced into the reaction tank 5. An agitator 14 is installed to mix physically the effluent water containing activated charcoal in the reaction tank. Alternatively, an air supply device 15 is installed to mix the effluent water containing an activated charcoal by supplying air into the reaction tank.

5 Claims, 1 Drawing Sheet

SYSTEM FOR TREATING DESALTER EFFLUENT WATER

FIELD OF THE INVENTION

The present invention relates to a system for treating effluent water which comes out from a desalter in an oil refinery process. More particularly, the present invention relates to a system for removing oil components and/or gas components in the effluent water coming out from the desalter, and lowering a level of COD (chemical oxygen demand) of the effluent water. The effluent water treated through the present system can be reused or recycled.

BACKGROUND OF THE INVENTION

Generally, crude petroleum contains various salts such as NaCl, $MgCl_2$, $CaCl_2$ and the like. Such salts in the crude petroleum should be removed in a desalter of an oil refinery process. In order to remove the salts in crude oil, a lot of degassed water is employed in the desalter. In other words, the degassed water removes the salts from the crude petroleum in the desalter, and discharges from the desalter. The water discharging from the desalter is called as effluent water. The effluent water still contains oil components, phenols, gas components such as $H_2S$ and $NH_3$, as well as salts. Accordingly, the effluent water shows a high level of COD. In order to discharge the effluent water to the sea, the effluent water should be treated. In general, the effluent water should be sent to a wastewater disposal plant for a biochemical treatment. As the amount of the effluent water coming out from a petroleum refinery process is about 30 to 60% of the total wastewater from all of the processes, the treatment of effluent water requires a large scale of treatment equipment and costs a lot.

One of the systems for treating effluent water has been developed by Nippon Oil Eng. Construction Co., and the system comprises a slop oil separator and a whole straight run ("WSR") separator (hereinafter, "NECC system"). It is possible to remove oil components in the effluent water by means of the NECC system, whereas COD components or gas components such as $H_2S$ and $NH_3$ in the effluent water may not be removed perfectly in the NECC system.

Accordingly, the present inventors have developed a system for treating effluent water coming out from a desalter so as to remove all the contaminating components, to lower the COD level of the effluent water, and finally to discharge the effluent water to the sea directly or to recycle the effluent water for other purposes.

OBJECTS OF THE INVENTION

An object of the present invention is to provide a new system for treating the effluent water discharging from the desalter in an oil refinery process so that the water may be recycled, without treatment at a wastewater disposal plant.

Another object of the present invention is to provide a system for treating the effluent water from the desalter in an oil refinery process so that the water may discharge to the sea directly, without treatment at a wastewater disposal plant.

A further object of the present invention is to provide a system for treating the effluent water, which will cause cost reduction for treatment of the effluent water by not treating the water at a disposal plant, and which will produce the recycling water economically.

The forgoing and other objects of the present invention will become more apparent from the following detailed description when read in conjunction with the accompanying drawing.

BRIEF DESCRIPTION OF THE DRAWING

The present invention will be more fully understood by reference to the following detailed description of the preferred embodiment of the present invention when read in conjunction with the accompanying drawing.

SUMMARY OF THE INVENTION

Figure 1:
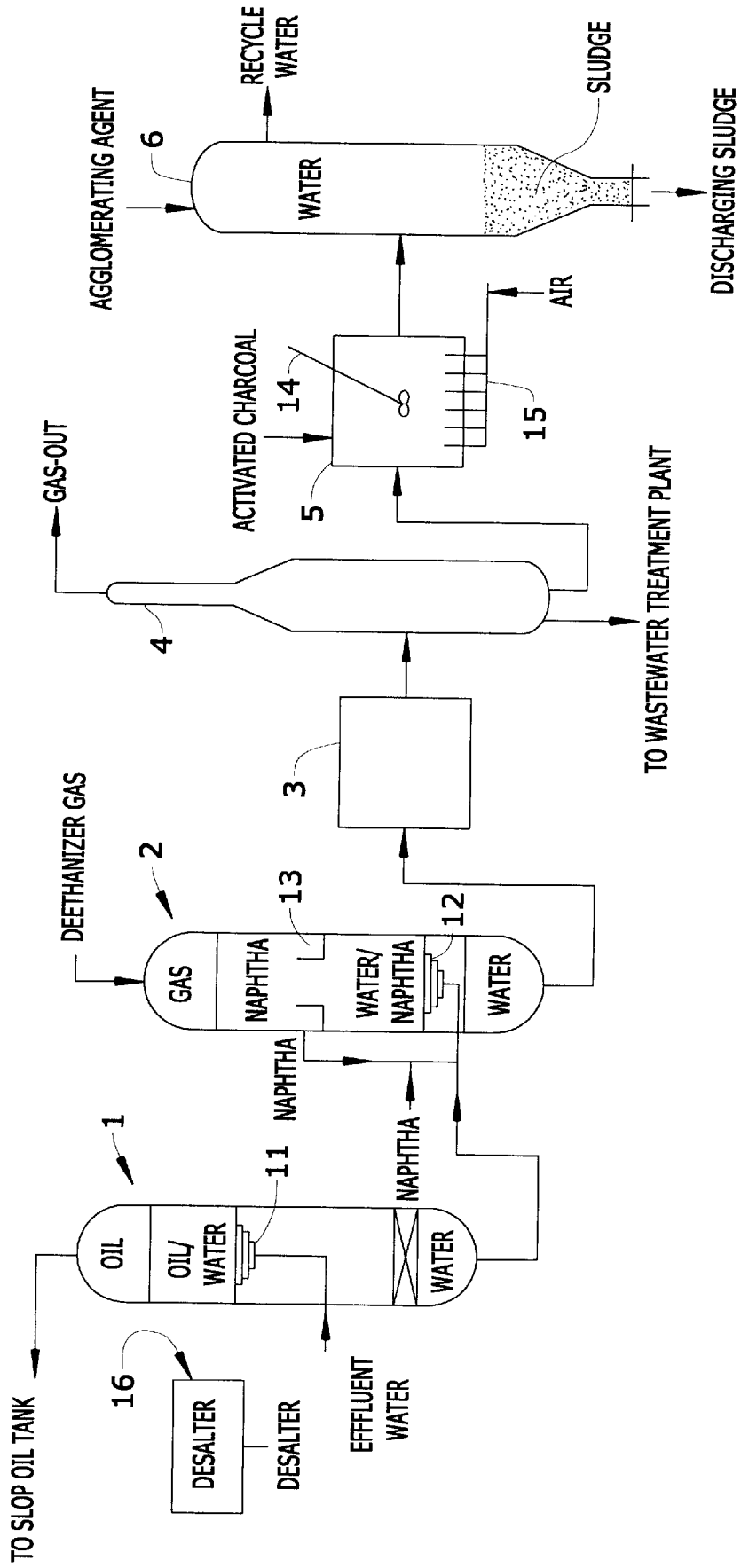
FIG. 1 is a schematic diagram of a system for treating effluent water in accordance with the present invention.

The system for treating effluent water coming out from the desalter in accordance with the present invention comprises a slop oil separator 1 for removing oil components in the effluent water from the desalter; a WSR separator 2 for further removing emulsion type oil components using naphtha; a water stripper 4 for removing gas components such as $H_2S$ and $NH_3$ in the effluent water discharged from the WSR separator; a reaction tank 5 for reacting organic and/or inorganic impurity matters such as phenols and suspended solids in the effluent water discharged from the water stripper with activated charcoal; and a settling tank 6 in which an agglomerating agent is introduced, thereby precipitating sludge in the lower part of the settling tank.

A buffering tank 3 may be installed between a desalter (not shown in FIG. 1) and an oil separator 1 or between a WSR separator 2 and a water stripper 4 to play a role as a buffer for safety in case of an accident in the process.

Activated charcoal is introduced into the reaction tank 5. An agitator 14 is installed to mix physically the effluent water containing activated charcoal in the reaction tank. Alternatively, an air supply device 15 is installed to mix the effluent water containing an activated charcoal by supplying air into the reaction tank.

According to the present invention, a method of treating effluent water from the desalter comprises the steps of removing oil components from the effluent water in a slop oil separator 1; removing emulsion type oil components using naphtha in a WSR separator 2; removing gas components such as $H_2S$ and $NH_3$ in a water stripper 4; reacting the remaining organic and/or inorganic impurity matters such as phenols and suspended solids with activated charcoal in a reaction tank 5; and precipitating sludge in the lower part of the settling tank 6 by introducing an agglomerating agent in the settling tank.

Before removing oil components from the effluent water in a slop oil separator 1, the method of treating effluent water further comprises a step of buffering the effluent water in a buffering tank. And, the method of treating effluent water further comprises a step of buffering the effluent water in a buffering tank 3 after removing emulsion type oil components using naphtha in a WSR separator 2.

The method of treating effluent water further comprises a step of agitating the effluent water with an agitator 14 in the reaction tank so as to effectively react remaining organic and/or inorganic impurity matters such as phenols and suspended solids with activated charcoal. Alternatively, the method of treating effluent water further comprises a step of supplying air into the reaction tank by using an air supply device 15 so as to effectively react remaining organic and/or inorganic impurity matters such as phenols and suspended solids with activated charcoal.

DETAILED DESCRIPTION OF THE PREFERRED EMBODIMENTS

Generally, crude petroleum contains various salts such as NaCl, $MgCl_2$, $CaCl_2$ and the like. Such salts in the crude petroleum should be removed in a desalter of an oil refinery process. In order to remove the salts in crude oil, a lot of degassed water is employed in the desalter. In other words, the degassed water removes the salts from the crude petroleum in the desalter, and discharges from the desalter. The water discharging from the desalter is called as effluent water. The effluent water still contains oil components, phenols, gas components such as $H_2S$ and $NH_3$, as well as salts. Accordingly, the effluent water shows a high level of COD. In order to discharge the effluent water to the sea, the effluent water should be treated. In general, the effluent water should be sent to a wastewater disposal plant for a biochemical treatment. As the amount of the effluent water coming out from a petroleum refinery process is about 30 to 60% of the total wastewater from all of the processes, the treatment of effluent water requires a large scale of treatment equipment and costs a lot.

The present invention is to provide a system for removing oil components and/or gas components in the effluent water coming out from the desalter, and lowering a level of COD (chemical oxygen demand) of the effluent water, thereby the effluent water treated through the present system being reused or recycled. FIG. 1 is a schematic diagram of a system for treating effluent water in accordance with the present invention.

In the oil refinery process, the effluent water comes out from a desalter and enters into a slop oil separator 1. The effluent water flows into the slop oil separator through a distributor 11. The oil component having a low specific gravity moves to the upper portion of the separator 1 and then discharges to the slop oil tank, and the water component having a high specific gravity remains in the lower portion of the separator and flows into a WSR separator 2 by a pump (not shown in FIG. 1).

The effluent water enters into the WSR separator 2 through a distributor 12. The effluent water is mixed with naphtha in the WSR separator. The naphtha is circulated in the WSR separator by a side settler 13, and a shortage of naphtha is replenished from the outside. In the upper portion of the WSR separator, a deethanizer gas is introduced to control the pressure in the WSR separator. Emulsion type oil components are removed by using naphtha in the WSR separator 2.

The effluent water flows into a water stripper 4 from the WSR separator. The water stripper is conventionally heated in order to remove gas components such as $H_2S$, $NH_3$ and the like that are dissolved in the effluent water. A COD level of the water after treated in the water stripper is about 100, which is insufficient to discharge the water to the sea. The COD level of the water for discharging to the sea should be less than 30. Therefore, the effluent water that is treated in the water stripper should be sent to a wastewater disposal plant for further treatment. The present invention is designed that the effluent water treated through the water stripper is discharged to the sea directly or recycled for other purposes without treating in wastewater disposal plant. The slop oil separator 1, WSR separator 2 and water stripper can be easily understood by an ordinary skilled person in the art.

In one embodiment of the present invention, the effluent water treated in the WSR separator is passed through a buffering tank 3 which is installed between the WSR separator and the water stripper, prior to flowing into the water stripper. The buffering tank prevents the effluent water from flowing into the water stripper in case of any accident in the desalter, thereby the system of the present invention being safely operated.

The effluent water feeds into a reaction tank 5 from the water stripper 4. The activated charcoal is introduced to the reaction tank and reacts with the effluent water. The activated charcoal is directly introduced to the reaction tank or introduced with the water flowing into the reaction tank. Particularly, the activated charcoal reacts with the remaining organic and/or inorganic impurity matters such as phenols and suspended solids in the reaction tank. In other words, the activated charcoal adsorbs all kinds of impurities and contaminants. It is preferable that the activated charcoal used in the present invention has a particle size of 350 mesh or less. In the present invention, the activated charcoal may be introduced into the reaction tank as a form of a powder or a liquid. An agitator 14 is installed to mix physically the effluent water containing activated charcoal in the reaction tank. Alternatively, an air supply device 15 is installed to mix the effluent water containing an activated charcoal by supplying air into the reaction tank. The residence time of the water in the reaction tank is preferably about 30 minutes.

The water treated in the reaction tank 5 is pumped to a settling tank 6. An agglomerating agent is introduced into the reaction tank for forming a sludge. That is, the activated charcoal component forms a sludge with an agglomerating agent in the settling tank. The sludge precipitates in the lower part of the settling tank, and the water in the upper part of the settling tank is discharged to the sea directly or recycled for other purposes. The agglomerating agent used in the present invention an anion agglomerating agent, and a representative example of the agent is polyacrylamide. The residence time of the water in the settling tank is preferably about 5 minutes. The accumulated sludge on the bottom of the settling tank is periodically discharged. The sludge contains much portion of activated charcoal and can be recycled for activated charcoal. A COD level of the water passed through the settling tank is in the range of about 15 to 25, which is lower than the limit value of 30 for discharging wastewater to the sea. Alternatively, the water flowing out from the settling tank can be recycled by the Flectrodialysis Reversal (EDR) treatment. The EDR treatment can be easily understood by an ordinary skilled person in the art.

According to the present invention, a method of treating effluent water from the desalter comprises the steps of removing oil components from the effluent water in a slop oil separator 1; removing emulsion type oil components using naphtha in a WSR separator 2; removing gas components such as $H_2S$ and $NH_3$ in a water stripper 4; reacting the remaining organic and/or inorganic impurity matters such as phenols and suspended solids with activated charcoal in a reaction tank 5; and precipitating sludge in the lower part of the settling tank 6 by introducing an agglomerating agent in the settling tank.

Before removing oil components from the effluent water in a slop oil separator 1, the method of treating effluent water further comprises a step of buffering the effluent water in a buffering tank. And, the method of treating effluent water further comprises a step of buffering the effluent water in a buffering tank 3 after removing emulsion type oil components using naphtha in a WSR separator 2.

The method of treating effluent water further comprises a step of agitating the effluent water with an agitator 14 in the reaction tank so as to effectively react remaining organic and/or inorganic impurity matters such as phenols and suspended solids with activated charcoal. Alternatively, the method of treating effluent water further comprises a step of supplying air into the reaction tank by using an air supply device 15 so as to effectively react remaining organic and/or inorganic impurity matters such as phenols and suspended solids with activated charcoal.

The present invention can be easily carried out by an ordinary skilled person in the art. Many modifications and changes may be deemed to be with the scope of the present invention as defined in the following claims.

What is claimed is:

1. A system for treating effluent water in an oil refinery process comprising:

a) a desalter 16 having a desalter outlet for effluent water having oil components, emulsion components, gas components, and organic and inorganic impurity matters;

b) a slop oil separator 1 arranged downstream of the desalter outlet for removing oil components from the effluent water, and having an oil separator outlet for discharging oil separator effluent;

c) a whole straight run separator 2 arranged downstream of the oil separator outlet and being in communication with a source of naphtha for removing emulsion components from the oil separator effluent with the naphtha, and further having a naphtha recycle stream and a straight run separator outlet for discharging straight run effluent;

d) a water stripper 4 arranged downstream of the straight run separator outlet for removing gas components from the straight run effluent, and further having a stripper outlet for discharging stripper effluent;

e) a reaction tank 5 arranged downstream of the stripper outlet and in communication with a source of activated charcoal for removing organic and inorganic impurity matters from the stripper effluent by reaction with the activated charcoal, and further having a reaction tank outlet for reaction tank effluent; and e) a settling tank 6 arranged downstream of the reaction tank outlet and in communication with a source of an agglomerating agent for precipitating a sludge in a lower portion of the settling tank from the reaction tank effluent with the agglomerating agent, and further having a first settling tank outlet for sludge discharge and a second settling tank outlet for recycle water.

2. The system as defined in claim 1 further comprising a holding tank 3 arranged between the desalter outlet and the slop oil separator 1.

3. The system as defined in claim 1 further comprising a holding tank 3 arranged between the whole straight run separator outlet and the water stripper 4.

4. The system as defined in claim 1 wherein said reaction tank 5 includes an agitator 14 to agitate the stripper effluent with the activated charcoal in the reaction tank 5.

5. The system as defined in claim 1 wherein said reaction tank 5 includes an air supply device 15 to supply air to agitate the stripper effluent with the activated charcoal in the reaction tank 5.

* * * * *